United States Patent
Ciano et al.

(10) Patent No.: US 10,169,023 B2
(45) Date of Patent: Jan. 1, 2019

(54) VIRTUAL CONTAINER DEPLOYMENT

(71) Applicant: International Business Machines Corporation, Armonk, NY (US)

(72) Inventors: Giuseppe Ciano, Rome (IT); Luigi Pichetti, Rome (IT); Maurizio Simeoni, Fiuggi (IT)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 15/425,232

(22) Filed: Feb. 6, 2017

(65) Prior Publication Data
US 2018/0225104 A1 Aug. 9, 2018

(51) Int. Cl.
*G06F 9/455* (2018.01)
*G06F 8/61* (2018.01)
*H04L 29/08* (2006.01)

(52) U.S. Cl.
CPC ............ *G06F 8/61* (2013.01); *G06F 9/45533* (2013.01); *H04L 67/10* (2013.01)

(58) Field of Classification Search
CPC ................................ G06F 8/61; G06F 9/45533
USPC .............................................. 717/176; 718/1
See application file for complete search history.

(56) References Cited

U.S. PATENT DOCUMENTS

| | | | | |
|---|---|---|---|---|
| 7,409,497 B1* | 8/2008 | Kazar | ............... | G06F 17/30067 707/999.01 |
| 7,552,424 B1* | 6/2009 | Bischof | ................ | G06F 11/006 714/36 |
| 7,698,334 B2* | 4/2010 | Kazar | ................... | G06F 3/0611 707/737 |
| 7,934,094 B2* | 4/2011 | Oyama | ................... | H04L 63/08 370/338 |

(Continued)

FOREIGN PATENT DOCUMENTS

WO 2015/126292 A1 8/2015
WO 2015192251 A1 12/2015

OTHER PUBLICATIONS

Integrating Docker to a Continuous Delivery pipeline : a pragmatic approach—Tuomas Vase; Jyväskylä: University of Jyväskylä, 1-66 pages; Information Systems Science, Master's Thesis—2016.*

(Continued)

*Primary Examiner* — Francisco J Aponte
(74) *Attorney, Agent, or Firm* — Patterson + Sheridan, LLP (57) ABSTRACT

A container deployment system for managing the installation of virtual containers in a cloud computing system is disclosed. The container deployment system retrieves runtime information of a plurality of virtual machines and containers installed in a cloud computing system. The retrieved runtime information includes information of a plurality of read-only layers in the plurality of virtual machines and containers. The container deployment system (Continued)

retrieves a policy requesting one or more of the plurality of read-only layers for installation of a new container in the cloud computing system. The container deployment system determines a virtual environment in the cloud computing system including the one or more of the plurality of read-only layers requested in the policy based on the retrieved runtime information, and installs the new container in the virtual environment.

21 Claims, 6 Drawing Sheets

(56) References Cited

U.S. PATENT DOCUMENTS

| | | | | |
|---|---|---|---|---|
| 8,161,076 | B1* | 4/2012 | Jernigan, IV | H04L 67/1097 707/793 |
| 8,225,316 | B1* | 7/2012 | Bunnell | G06F 8/68 718/1 |
| 8,381,231 | B2* | 2/2013 | Kacin | G06F 9/45537 719/317 |
| 8,612,994 | B1* | 12/2013 | Sanderson | G06F 9/455 707/705 |
| 8,639,971 | B1* | 1/2014 | White | G06F 11/0709 707/687 |
| 8,683,459 | B2* | 3/2014 | Gebhart | G06F 9/45533 717/172 |
| 8,683,466 | B2* | 3/2014 | Raj Seeniraj | G06F 9/452 718/1 |
| 8,862,940 | B2* | 10/2014 | Qiu | G06F 11/368 714/28 |
| 9,086,903 | B2* | 7/2015 | Khatri | G06F 9/45533 |
| 9,116,768 | B1 | 8/2015 | Sawhney et al. | |
| 9,223,966 | B1* | 12/2015 | Satish | G06F 21/53 |
| 9,247,312 | B2* | 1/2016 | Braness | G11B 27/005 |
| 9,256,467 | B1 | 2/2016 | Singh et al. | |
| 9,311,158 | B2* | 4/2016 | Tompkins | G06F 9/5072 |
| 9,547,453 | B2* | 1/2017 | Glazemakers | G06F 3/0641 |
| 9,612,815 | B1* | 4/2017 | Jagtap | G06F 8/61 |
| 9,652,273 | B2* | 5/2017 | Davis | G06F 9/45545 |
| 9,661,071 | B2* | 5/2017 | Manglik | H04L 67/1014 |
| 9,672,078 | B2* | 6/2017 | Kacin | G06F 9/45537 |
| 9,715,460 | B1* | 7/2017 | Krasner | G06F 12/109 |
| 9,888,067 | B1* | 2/2018 | Yemini | H04L 67/1023 |
| 9,910,657 | B2* | 3/2018 | Babol | G06F 8/64 |
| 9,916,233 | B1* | 3/2018 | Qureshi | G06F 11/3692 |
| 10,079,719 | B2* | 9/2018 | Dhanakshirur | H04L 41/0816 |
| 2007/0234295 | A1* | 10/2007 | Dufour | G06F 11/3644 717/124 |
| 2008/0244525 | A1* | 10/2008 | Khalil | G06F 11/3688 717/124 |
| 2008/0250406 | A1* | 10/2008 | Carpenter | G06F 9/45558 718/1 |
| 2009/0217260 | A1* | 8/2009 | Gebhart | G06F 8/62 717/174 |
| 2009/0328225 | A1* | 12/2009 | Chambers | G06F 21/10 726/26 |
| 2010/0100880 | A1* | 4/2010 | Shigeta | G06F 11/3696 718/1 |
| 2010/0100881 | A1* | 4/2010 | Shigeta | G06F 11/2247 718/1 |
| 2011/0265081 | A1* | 10/2011 | Lucovsky | G06F 8/60 717/177 |
| 2011/0265164 | A1* | 10/2011 | Lucovsky | G06F 9/45533 726/7 |
| 2013/0031549 | A1* | 1/2013 | Osmond | G06F 9/54 718/1 |
| 2013/0198764 | A1 | 8/2013 | Kacin et al. | |
| 2014/0047341 | A1* | 2/2014 | Breternitz | G06F 9/505 715/735 |
| 2014/0068611 | A1* | 3/2014 | McGrath | G06F 9/45533 718/1 |
| 2014/0181395 | A1* | 6/2014 | Vincent | G06F 11/1456 711/111 |
| 2015/0302220 | A1* | 10/2015 | Cismas | H04L 63/102 707/783 |
| 2015/0370586 | A1* | 12/2015 | Cooper | G06F 9/45533 710/308 |
| 2016/0077869 | A1* | 3/2016 | Grueneberg | H04L 67/10 718/1 |
| 2016/0092252 | A1* | 3/2016 | Wagner | G06F 9/45533 718/1 |
| 2016/0098285 | A1* | 4/2016 | Davis | G06F 9/45545 718/1 |
| 2016/0110192 | A1* | 4/2016 | Mikkilineni | G06F 11/14 718/100 |
| 2016/0182540 | A1* | 6/2016 | Ghosh | G06F 21/55 726/23 |
| 2016/0205518 | A1* | 7/2016 | Patel | H04L 67/1002 455/518 |
| 2016/0342801 | A1* | 11/2016 | Sreekanti | G06F 21/6209 |
| 2016/0350081 | A1* | 12/2016 | Kumar | G06F 8/30 |
| 2016/0350205 | A1* | 12/2016 | Safari | G06F 11/1433 |
| 2016/0359955 | A1* | 12/2016 | Gill | G06F 9/45558 |
| 2016/0371108 | A1* | 12/2016 | Madtha | G06F 9/45558 |
| 2016/0378518 | A1* | 12/2016 | Antony | G06F 9/45533 718/1 |
| 2016/0380909 | A1* | 12/2016 | Antony | H04L 47/722 370/236 |
| 2017/0052807 | A1* | 2/2017 | Kristiansson | G06F 9/54 |
| 2017/0109269 | A1* | 4/2017 | Angermayer | G06F 11/3688 |
| 2017/0116042 | A1* | 4/2017 | Xu | G06F 9/5083 |
| 2017/0168715 | A1* | 6/2017 | Eshwarappa | G06F 3/0604 |
| 2017/0177860 | A1* | 6/2017 | Suarez | G06F 21/53 |
| 2017/0180346 | A1* | 6/2017 | Suarez | G06F 9/45558 |
| 2017/0270083 | A1* | 9/2017 | Pruitt | G06F 17/30896 |
| 2017/0374318 | A1* | 12/2017 | Yang | H04N 7/15 |
| 2018/0114012 | A1* | 4/2018 | Sood | G06F 21/53 |

OTHER PUBLICATIONS

A Performance Study of Containers in Cloud Environment; Bowen Ruan, Hang Huang, Song Wu) and Hai Jin—Services Computing Technology and System Lab Cluster and Grid Computing Lab, and Huazhong University of Science and Technology China; Nov. 2016.*

VM2Docker: Automating the Conversion from Virtual Machine to Docker Container; Eric Lubin, Massachusetts Institute of Technology—Feb. 2015.*

Mingwei Zhang, Daniel Marino, and Petros Efststathopoulos, Harbormaster: Policy Enforcement for Container, IEEE, Nov. 30-Dec. Dec. 3, 2015, Available: <http://ieeexplore.ieee.org/xpl/articleDetails.jsp?arnumber=7396177>.

Sareh Fotuhi Piraghaj, Amir Vahid Dastjerdi, Rodrigo N. Calheiros, and Rajkumar Buyya, "Efficient Virtual Machine Sizing for Hosting Containers as a Service," Proceedings of the 2015 IEEE World Congress on Services, Jun. 27, 2015, pp. 31-38.

* cited by examiner

VIRTUAL CONTAINER DEPLOYMENT

BACKGROUND

The present disclosure relates to virtual container deployment, and more specifically, to the deployment of one or more virtual containers in a cloud computing system.

Cloud computing is a type of Internet-based computing that provides shared computer processing resources and data to computers and other devices on demand. Cloud computing allows a user to access virtual computing resources (e.g., storage, data, applications, and even complete virtualized computing systems) in "the cloud," without regard for the underlying physical systems (or locations of those systems) used to provide the computing resources.

SUMMARY

One embodiment of the present invention provides a method. The method includes retrieving runtime information of a plurality of virtual machines and containers installed in a computing system, wherein the runtime information includes information of a plurality of read-only layers in the plurality of virtual machines and containers. The method also includes retrieving at least one policy requesting one or more of the plurality of read-only layers for installation of a first container in the computing system. Installing the first container comprises adding a writable layer on top of the one or more of the plurality of read-only layers requested in the at least one policy. The method further includes determining a virtual environment in the computing system including the one or more of the plurality of read-only layers requested in the at least one policy based on the retrieved runtime information and installing the first container in the virtual environment.

One embodiment of the present invention provides a system that includes a processor and a memory. The memory contains a program that, when executed on the processor, performs an operation. The operation includes retrieving runtime information of a plurality of virtual machines and containers installed in a computing system, wherein the runtime information includes information of a plurality of read-only layers in the plurality of virtual machines and containers. The operation also includes retrieving at least one policy requesting one or more of the plurality of read-only layers for installation of a first container in the computing system. Installing the first container comprises adding a writable layer on top of the one or more of the plurality of read-only layers requested in the at least one policy. The operation further includes determining a virtual environment in the computing system including the one or more of the plurality of read-only layers requested in the at least one policy based on the retrieved runtime information and installing the first container in the virtual environment.

One embodiment of the present invention provides a computer program product that includes a computer-readable storage medium having computer readable program code embodied therewith. The computer readable program code retrieves runtime information of a plurality of virtual machines and containers installed in a computing system, wherein the runtime information includes information of a plurality of read-only layers in the plurality of virtual machines and containers. The computer readable program code also retrieves at least one policy requesting one or more of the plurality of read-only layers for installation of a first container in the computing system. Installing the first container comprises adding a writable layer on top of the one or more of the plurality of read-only layers requested in the at least one policy. The computer readable program code further determines a virtual environment in the computing system including the one or more of the plurality of read-only layers requested in the at least one policy based on the retrieved runtime information and installs the first container in the virtual environment.

DETAILED DESCRIPTION

One way of providing cloud computing service is virtualization. Virtualization uses software to simulate the existence of hardware and create a virtual computing system. Virtualization allows users to create virtualization environments on a server. Some examples of virtual environments include virtual machines and virtual appliances.

Virtual containers are an emerging virtualization technology used in cloud computing systems. By using operating system-level virtualization, the kernel of an operating system allows the existence of multiple virtual containers. Each virtual container runs one process of one software application. Compared to virtual machines, virtual containers provide several advantages including higher speed of deployment and less required system resources. However, new challenges are raised regarding how to choose the best virtual environment to effectively deploy a virtual container in a cloud computing system.

Virtual containers (e.g., Docker containers) provide several advantages, such as enabling users to install and/or run more applications on a single physical server than a virtual machine can. Also, a virtual container requires significantly less resources than a virtual machine. For example, a virtual machine requires not only a full copy of an operating system, but also a virtual copy of all the hardware that the operating system needs to run. In contrast, a virtual container only requires an operating system, supporting programs and libraries, and system resources to run a specific software program. Thus, a virtual container is usually Megabytes in size rather than Gigabytes as a virtual machine. Also, a virtual container can be deployed in milliseconds while a virtual machine usually requires several seconds or even minutes to boot.

However, there are some problems when deploying a virtual container in a cloud computing system. One challenge is determining a suitable virtual environment in the cloud computing system to deploy the virtual container, based on factors such as usage and/or working load of the virtual container. Another problem is effectively migrating an application in a virtual container from one virtual environment to another virtual environment, based on factors such as resources assigned to the virtual container.

The present disclosure provides a solution of deploying a virtual container in a cloud computing system based on layer information included in the virtual environment. In one embodiment, a container deployment system retrieves runtime information of a plurality of virtual machines and containers already installed in a cloud computing system. The container deployment system also retrieves at least one policy requesting one or more layers for installation of a new container in the cloud computing system. The container deployment system determines a virtual environment in the cloud computing system satisfying the at least one policy, based on the retrieved runtime information and installs the new container in the determined virtual environment. With the present disclosure, the container deployment system chooses the best virtual environment to effectively deploy a virtual container in a cloud computing system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. For example, the container deployment system can be executed in the cloud. In such a case, the container deployment system could retrieve runtime information and the policy in the cloud. Doing so allows a user to access this information from any computing system attached to a network connected to the cloud (e.g., the Internet).

Figure 1:
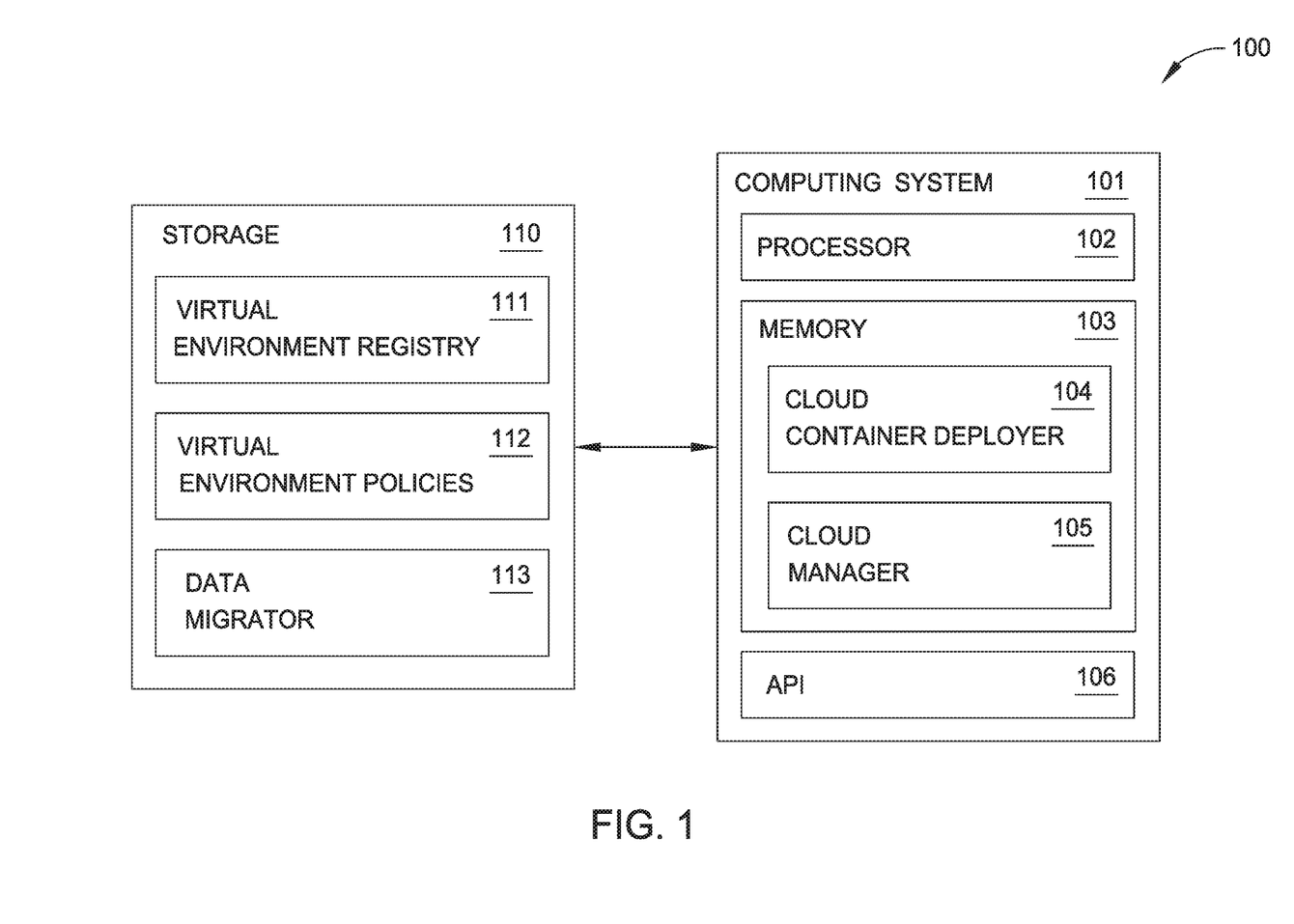
FIG. 1 shows a container deployment system, according to one embodiment described herein.

With reference now to FIG. 1. FIG. 1 shows a container deployment system 100, according to one embodiment herein. The container deployment system 100 includes a computing system 101. The computing system 101 includes a processor 102, a memory 103 and an Application Program Interface (API) 106. The processor 102 may be any computer processor capable of performing the functions described herein. Although memory 103 is shown as a single entity, memory 103 may include one or more memory devices having blocks of memory associated with physical addresses, such as random access memory (RAM), read only memory (ROM), flash memory or other types of volatile and/or non-volatile memory. Users can input commands to the computing system 101 through the API 106.

According to one embodiment herein, memory 103 includes a cloud container deployer 104 and a cloud manager 105. The cloud container deployer 104 manages the installation and/or migration of virtual containers in a clouding computing system. The cloud manager 105 executes the installation and/or migration of virtual containers based on the instructions from the cloud container deployer 104.

The container deployment system 100 also includes storage 110. According to one embodiment herein, storage 110 includes a Virtual Environment Registry (VER) database 111, a Virtual Environment Policies (VEP) database 112 and a Data Migrator (DM) database 113. The VER database 111 stores runtime information of a plurality of virtual machines and containers already installed in a cloud computing system. The VEP database 112 stores policies of installing a new container in the cloud computing system. The DM database 114 stores data and/or scripts needed by the container deployment system 100 to perform container migration from one virtual environment to another virtual environment.

The computing system 101 communicates with the storage 110 to manage the installation and/or migration of virtual containers in a clouding computing system, which will be described in details below. In one embodiment, the storage 110 may be included in the computing system 101. In another embodiment, the computing system 101 may access the storage 110 through a communication network, e.g., a local area network (LAN) or a wide area network (WAN), or the Internet (not shown in FIG. 1). In another embodiment, the storage 110 may be located in the cloud.

Figure 2:
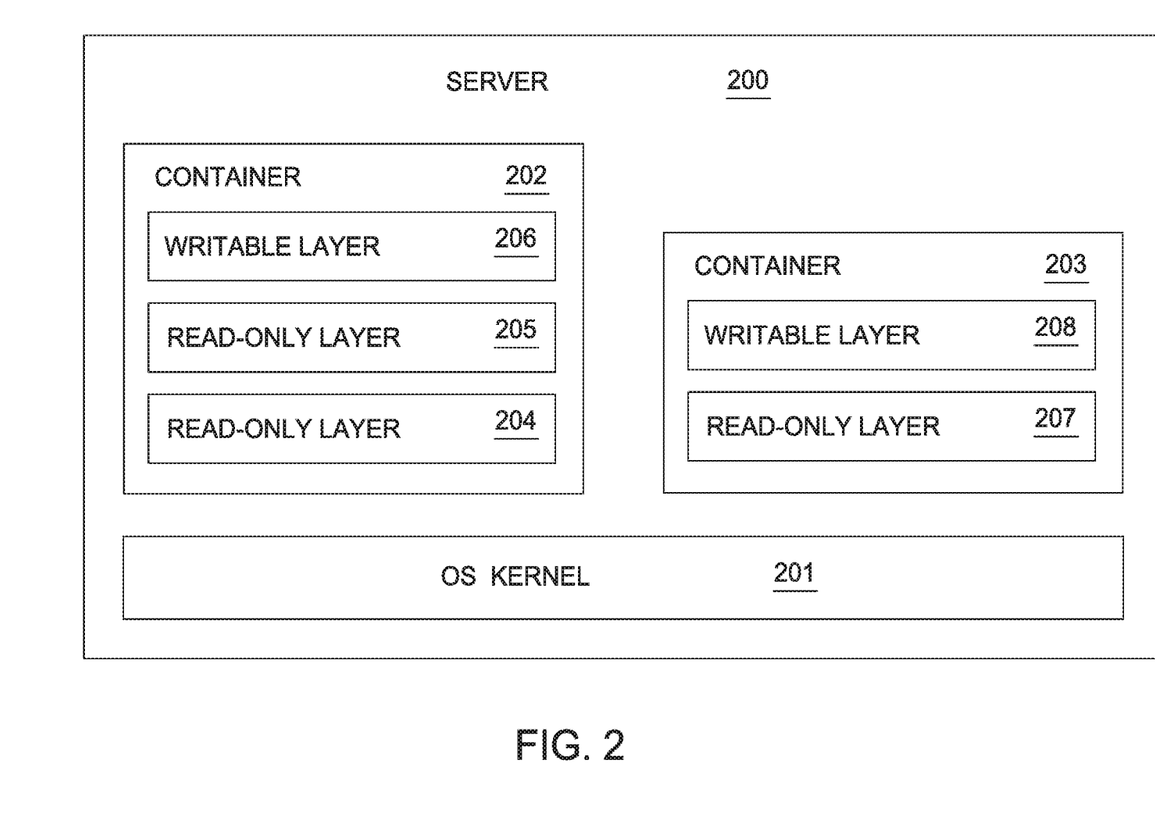
FIG. 2 shows virtual containers with layer information, according to one embodiment described herein.

The present disclosure provides techniques for deploying a virtual container in a cloud computing system based on layer information included in the virtual environment. FIG. 2 shows virtual containers with layer information, according to one embodiment described herein.

As shown in FIG. 2, a server 200 includes an operating system kernel 201 that hosts two virtual containers 202 and 203. In other words, the two virtual containers 202 and 203 are installed and implemented on the operating system kernel 201. In one embodiment, the operating system kernel 201 is a Linux kernel in the server 200. In one embodiment, the operating system kernel 201 is a Linux Container (LXC), which itself is a virtual operating system hosted by a Linux kernel in the server 200. In one embodiment, the operating system kernel 201 includes file systems such as advanced multi-layered unification filesystem (aufs) and B-tree file system (btrfs). In one embodiment, the operating system kernel 201 is residing in a cloud computing system. In one embodiment, the containers 202 and 203 are Docker containers. As understood in the art, Docker is an open-source project that automates the deployment of Linux applications inside software containers. Docker provides an additional layer of abstraction and automation of operating-system-level virtualization on Linux. Docker uses the resource isolation features of the Linux kernel such as cgroups and kernel namespaces, and a union-capable file system such as OverlayFS and others to allow independent "containers" to run within a single Linux instance, avoiding the overhead of starting and maintaining virtual machines. Docker containers wrap a piece of software in a complete filesystem that contains everything needed to run: code, runtime, system tools, system libraries—anything that can be installed on a server. This guarantees that the software will always run the same, regardless of its environment.

The container 202 includes a read-only layer 204, a read-only layer 205 and a writable layer 206 on top of the read-only layer 204 and read-only layer 205. The read-only layer 204 and read-only layer 205 include information for creating container 202. By adding the writable layer 206 on top of the read-only layer 204 and read-only layer 205, the container 202 is created.

In one embodiment, the read-only layer 204 and read-only layer 205 may include commands such as add apache and add emacs. Also, the read-only layer 204 and read-only layer 205 may include virtual operating system such as Debian and software applications such as Busy Box, as understood in the art. All the changes made to the read-only layer 204 and read-only layer 205 are written to the writable layer 206. Also, the writable layer 206 runs users' application process in container 202.

Similarly, the container 203 includes a read-only layer 207 and a writable layer 208 on top of the read-only layer 207. The read-only layer 207 includes information for creating the container 203. By adding the writable layer 208 on top of the read-only layer 207, the container 203 is created. All the changes made to the read-only layer 207 are written to the writable layer 208. Also, the writable layer 208 runs users' application process in container 203.

FIG. 2 only shows one embodiment. In other embodiments, the operating system kernel 201 can host a different number of containers. In other embodiments, each container can include a different number of read-only layers with different information for creating the corresponding container.

The combination one or more read-only layers for creating a container is called an image. For examples, the container 202 is created based on an image including the read-only layer 204 and read-only layer 205, and the container 203 is created based on an image including the read-only layer 207. In one embodiment, the layers of images are shared by all the containers installed on the same kernel. Also, the layers of images are available when deploying a new container on the same kernel. That is, it is not needed to download and install these layers every time when deploying or installing a new container on the same kernel. For example, when installing a new container based on an image including the read-only layer 204 and read-only layer 205, it is not needed to download and install the read-only layer 204 and read-only layer 205. The container deployment system 100 adds a writable layer on top of the already available read-only layer 204 and read-only layer 205 to create the new container.

Deploying or installing a new container on the kernel includes adding a writable layer on top of one or more available read-only layers (i.e., on top of an available image) to create the new container. Some read-only layers are crucial for installing the new container, based on the usage of the container and/or the application process run in the container. Some read-only layers are less important for installing the new container. Some read-only layers are not needed for installing the new container. Different combinations of read-only layers, i.e., different images, represent different virtual environments. The present disclosure provides a solution of installing a new container on the kernel in the best virtual environment in a cloud computing system. In other words, the present disclosure provides a solution of installing a new container by adding a writable layer on top of the most suitable read-only layers to create the new container on the kernel in a cloud computing system.

Figure 3:
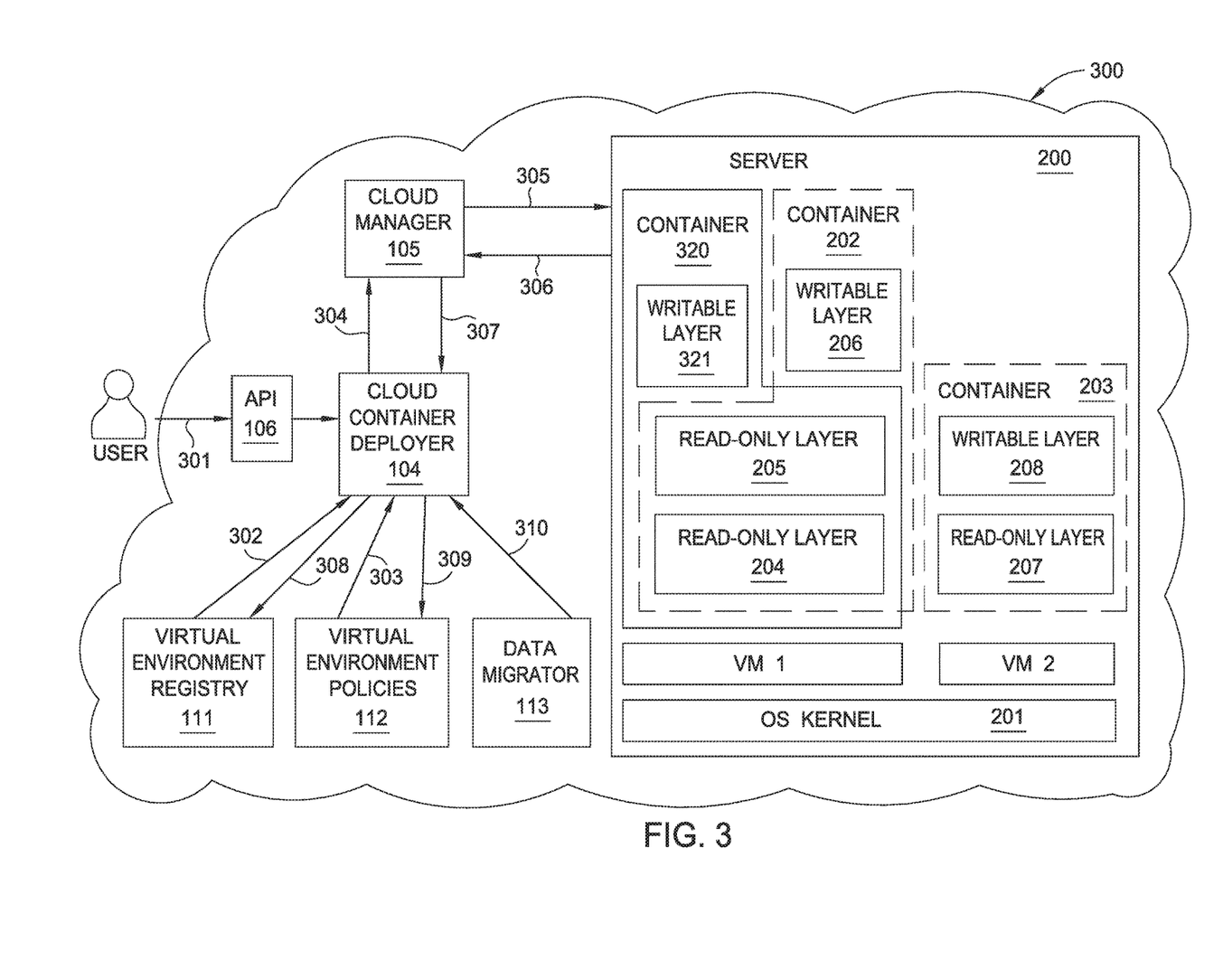
FIG. 3 shows interactions among different components of the container deployment system, according to one embodiment described herein.

FIG. 3 shows interactions among different components of the container deployment system 100, according to one embodiment described herein. In the embodiment as shown in FIG. 3, the containers are installed on virtual machines hosted by the OS kernel 201. Installing containers on multiple virtual machines increases the capability to deploy more containers because multiple containers can be installed on each virtual machine. Thus, installing containers on multiple virtual machines hosted by the kernel allows running more applications than installing containers directly on the kernel.

A user can trigger the installation of a new container for running an application process in a cloud computing system 300. In one embodiment, the user can input commands through the API 106 to the cloud container deployer 104 to trigger the installation of the new container, as indicated by arrow 301 in FIG. 3.

After receiving the trigger to install a new container, the cloud container deployer 104 retrieves runtime information from the VER database 111, as indicated by arrow 302 in FIG. 3.

The VER database 111 stores runtime information of a plurality of virtual machines and containers already installed in the cloud computing system 300. In one embodiment, the runtime information includes information of a plurality of read-only layers already available in the plurality of virtual machines and containers. As shown in FIG. 3, in the cloud computing system 300, two virtual machines VM1 and VM2 are hosted by the OS kernel 201 in the server 200 of the cloud computing system 300. The container 202 is already installed on VM1. As shown in in FIG. 3, the container 202 includes a writable layer 206 on top of the read-only layer 204 and read-only layer 205, as indicated by the left dashed box in the cloud computing system 300. Similarly, the container 203 is already installed on VM2. As shown in in FIG. 3, the container 203 includes a writable layer 208 on top of the read-only layer 207, as indicated by the right dashed box in the cloud computing system 300.

In one embodiment, the retrieved runtime information from the VER database 111 includes information of the read-only layer 204, the read-only layer 205 and the read-only layer 207. For example, the retrieved runtime information includes bins/libs of the read-only layer 204, the read-only layer 205 and the read-only layer 207. In one embodiment, the retrieved runtime information includes information of VM1 and VM2. For example, the retrieved runtime information includes information of virtual OS and/or hypervisor of VM1 and VM2. In another embodiment, the retrieved runtime information includes information of the writable layer 206 and writable layer 208. For example, the retrieved runtime information includes information of the corresponding application process running in the writable layer 206 and writable layer 208.

The VEP database 112 stores policies of installing a new container in the cloud computing system. The cloud container deployer 104 retrieves at least one policy from the VEP database 112, as indicated by arrow 303 in FIG. 3. The policy indicates the virtual environment requirements for installing the new container. In one embodiment, the policy requests one or more of the available plurality of read-only layers for installation of the new container in the cloud computing system 300. One exemplary policy is to install the new container in a virtual environment with most available read-only layers.

The cloud container deployer 104 determines a suitable virtual environment for installing the new container to satisfy the policy, based on the retrieved runtime information from the VER database 111.

As shown in FIG. 3, there are two virtual environments available in the cloud computing system 300. The first virtual environment includes VM1, the read-only layer 204 and read-only layer 205. Installing the new container in the first virtual environment includes adding a writable layer on top of the read-only layer 204 and read-only layer 205 on VM1. The second virtual environment includes VM2 and the read-only layer 207. Installing the new container in the second virtual environment includes adding a writable layer on top of the read-only layer 207 on VM2.

In one embodiment, the policy requires to install the new container in a virtual environment with most number of available read-only layers. Thus, in order to satisfy the policy, the cloud container deployer 104 determines that the new container should be installed in the first virtual environment, which has two available read-only layers comparing to only one available read-only layer in the second virtual environment.

In another embodiment, the policy requires to install the new container in a virtual environment with a specific layer, e.g., the read-only layer 207. Thus, in order to satisfy the policy, the cloud container deployer 104 determines that the new container should be installed in the second virtual environment, which has the read-only layer 207.

In another embodiment, the policy requires to install the new container in a virtual environment with read-only layers of largest size. Read-only layers with larger size include more useful information for installing the new container. For example, the read-only layer 207 includes bins/libs with a size of 5 Megabytes. The read-only layer 204 and read-only layer 205 include bins/libs with a size of 3 Megabytes in total. Thus, in order to satisfy the policy, the cloud container deployer 104 determines that the new container should be installed in the second virtual environment, which has the read-only layer 207 with a larger size than the total size of the read-only layer 204 and read-only layer 205 in the first virtual environment.

In another embodiment, the policy requires to install the new container in a virtual environment with highest weight value. In this embodiment, the cloud container deployer 104 determines a weight value for each available layer and selects the virtual environment with the highest accumulative weight value to install the new container. In one embodiment, the cloud container deployer 104 determines the weight value for each available layer based on factors including but not limited to usage and load of the layer, size of the layer, information contained in the layer. In one embodiment, the cloud container deployer 104 determines a weight value for a layer indicating the importance of the layer for installing the new container. A higher weight value for the layer indicates that the layer has a higher importance for installing the new container. In one embodiment, the weight value can be a number from 0 to 1. For example, the cloud container deployer 104 can determine that the read-only layer 204 has a weight value 0.2, the read-only layer 205 has a weight value 0.4, and the read-only layer 207 has weight value 0.5. In this example, although the read-only layer 207 has a higher weight value 0.5 comparing to the weight values of the read-only layer 204 and the read-only layer 205, the cloud container deployer 104 selects the first virtual environment with an accumulative weight value 0.6 to install the new container.

In another embodiment, the policy requires to install the new container in a virtual environment with read-only layers including more important information or higher weight value. For example, installing a new container needs the read-only layer 204 with a weight value 0.2 and the read-only layer 207 with a weight value 0.5. However, the read-only layer 204 and the read-only layer 207 are in two different virtual environments. In this situation, the cloud container deployer 104 determines that the new container should be installed in the second virtual environment, which has the read-only layer 207 with a higher weight value of 0.5.

In other embodiments, the cloud container deployer 104 can determine the virtual environment for installing a new container, based on different polices indicating the virtual environment requirements, as understood in the art.

The cloud container deployer 104 sends instructions regarding installing the new container to the cloud manager 105, as indicated by arrow 304 in FIG. 3. In one embodiment. based on the instructions from the cloud container deployer 104, the cloud manager 105 installs the new container 320 in the first virtual environment on the server 200, as indicated by arrow 305 in FIG. 3. The new container 320 is created and installed by adding a writable layer 321 on top of the read-only layer 204 and read-only layer 205 on VM1, as indicated by the solid-line box in the cloud computing system 300.

After the new container 320 is installed in the cloud computing system 300, the cloud manager 105 retrieves information of the new container from the server 200, as indicated by arrow 306 in FIG. 3. In one embodiment, the retrieved information of the new container includes information of the writable layer 321.

The cloud manager 105 sends the retrieved information of the new container to the cloud container deployer 104, as indicated by arrow 307 in FIG. 3. The cloud container deployer 104 sends the retrieved information of the new container to the VER database 111 to update the runtime information of virtual machines and containers already installed in the cloud computing system 300, as indicated by arrow 308 in FIG. 3.

In one embodiment, the cloud container deployer 104 can also sends user's instructions or requirements to the VEP database 112 to update the policies in the VEP database 112, as indicated by arrow 309 in FIG. 3.

In one embodiment, the container needs to be migrated from one virtual environment to another virtual environment, based on factors such as application requirement, workload of the container, and system resources assigned to the container. For example, container 202 is first installed in the first virtual environment. After a time period, the application process running in container 202 is better hosted by VM2, based on factors such as workload and resources of VM2. In this situation, container 202 needs to be migrated from the first virtual environment to the second virtual environment.

The cloud container deployer 104 retrieves information from the DM database 113, as indicated by arrow 310 in FIG. 3. The retrieved information from the DM database 113 includes data and/or scripts needed to perform container migration from the first virtual environment to the second virtual environment. After retrieving information from the DM database 113, the cloud container deployer 104 sends instructions to the cloud manager 105. The cloud manager 105 migrates container 202 from the first virtual environment to the second virtual environment, as understood in the art.

FIG. 3 shows only one embodiment. In other embodiments, the cloud computing system 300 includes more than two virtual environments. In other embodiments, the virtual environment includes different number of layers with different information. In other embodiments, the virtual environment does not include VMs.

In one embodiment, the container deployment system 100 performs the deployment, migration and/or removal of containers in the cloud computing system according to a system scan procedure.

In one embodiment, the computing system 101 further includes a software entity such as a system scanning program to perform the system scan procedure. The system scanning program retrieves information of the plurality of virtual machines and containers already installed in the cloud computing system 300. The system scanning program also retrieves information of application processes and/or software products installed in the plurality of virtual machines and containers. Based on the retrieved information, the system scanning program provides instructions regarding whether to deploy, migrate and/or remove a container.

In one embodiment, a user manually controls the system scanning program to retrieve the information. For example, when first time installing a container in the cloud computing system 300, the user manually controls the system scanning program to retrieve the information for installing the container. In another embodiment, the system scanning program retrieves the information according to a scheduled periodicity. In another embodiment, the system scanning program is triggered by an event received from the cloud service provider. For example, the system scanning program receives an event from the cloud service provider that a new application is required by the user. Upon receiving the event, the system scanning program retrieves the information and provides instructions regarding whether to deploy s new container for the new application.

One advantage of the present disclosure is that the system scanning program performs the system scan procedure, e.g., retrieves information of the cloud computing system 300, without any agent. In some systems, such as Tivoli Service Automation Manager (TSAM) and Tivoli Provisioning Manager (TPM) systems, an agent is installed in the VMs in order to scan information of the system.

Figure 4:
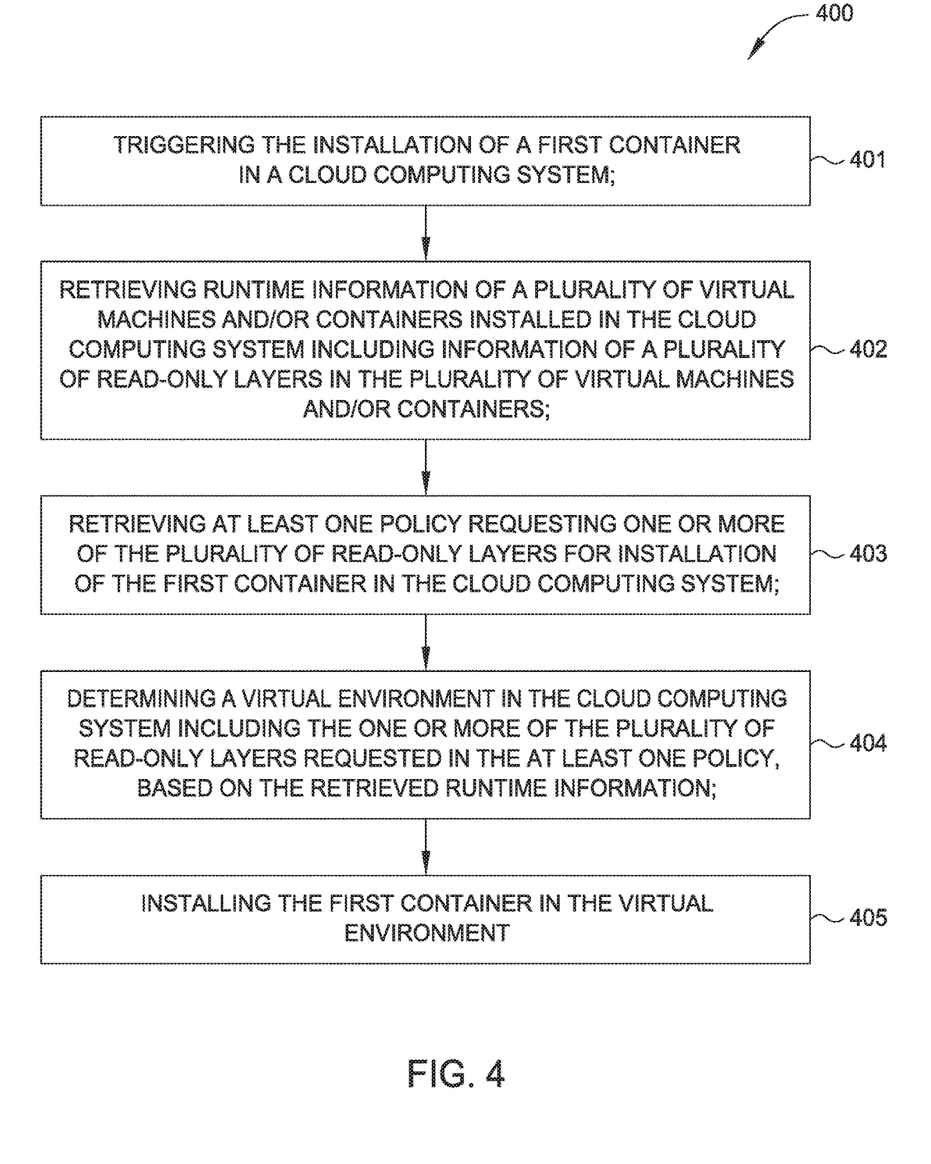
FIG. 4 is a flowchart that illustrates a method of deploying a virtual container in a cloud computing system, according to one embodiment described herein.

FIG. 4 is a flowchart that illustrates a method 400 of deploying a virtual container in a cloud computing system, according to one embodiment described herein. In FIG. 4, at block 401, a user triggers the installation of a first container for running an application process in a cloud computing system. At block 402, the cloud container deployer 104 retrieves runtime information of a plurality of virtual machines and/or containers installed in the cloud computing system from the VER data base 111. The runtime information includes information of a plurality of read-only layers in the plurality of virtual machines and/or containers. At block 403, the cloud container deployer 104 retrieves at least one policy requesting one or more of the plurality of read-only layers for installation of the first container in the cloud computing system from the VEP database 112. At block 404, the cloud container deployer 104 determines a virtual environment in the cloud computing system including the one or more of the plurality of read-only layers requested in the at least one policy, based on the retrieved runtime information. At block 405, the cloud manager 105 installs the first container in the virtual environment determined by the cloud container deployer 104.

Figure 5:
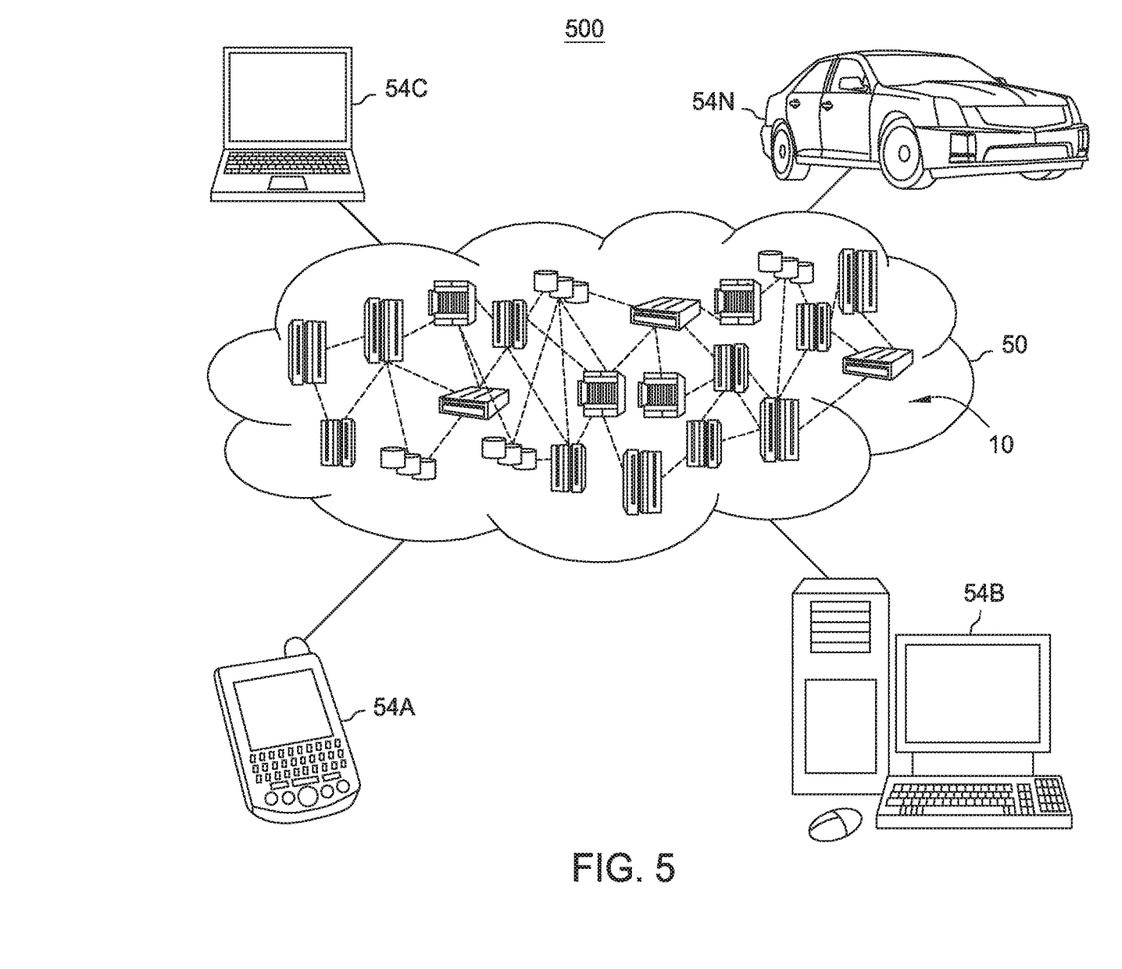
FIG. 5 shows a cloud computing environment, according to one embodiment described herein.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser). In one embodiment, one or more cloud computing nodes 10 include the container deployment system 100.

Figure 6:
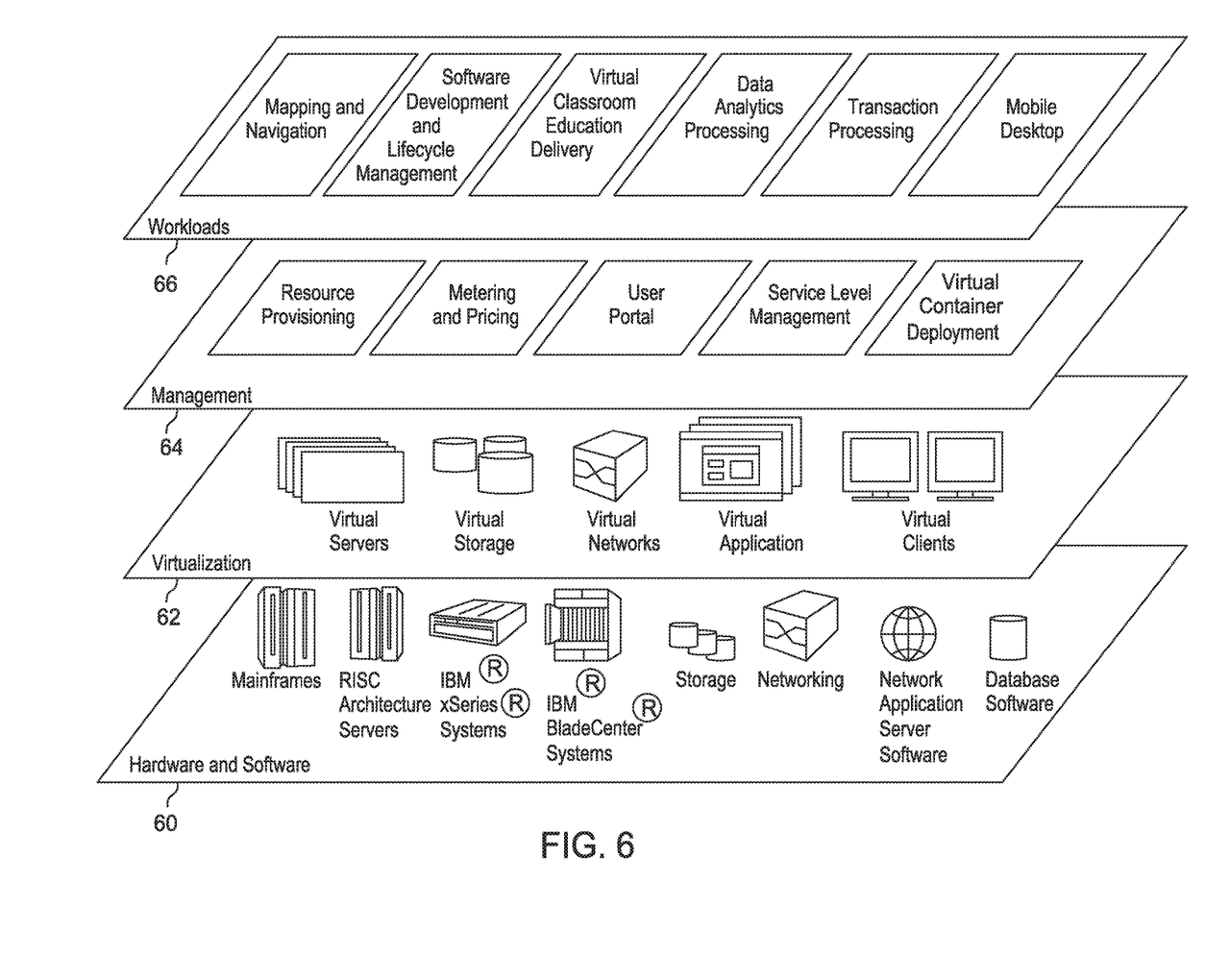
FIG. 6 shows abstraction model layers of the cloud computing environment, according to one embodiment described herein.

Referring now to FIG. 6, a set of functional abstraction layers provided by cloud computing environment 50 (in FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications such as virtual containers and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Virtual container deployment installs virtual containers in a suitable virtual environment. In one embodiment, Virtual container deployment installs virtual containers in a suitable virtual environment based on one or more policies as described above.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

While the foregoing is directed to embodiments of the present invention, other and further embodiments of the invention may be devised without departing from the basic scope thereof, and the scope thereof is determined by the claims that follow.

What is claimed is:

1. A computer-implemented method of virtual container deployment, the computer-implemented method comprising:

retrieving runtime information of a plurality of virtual environments and containers installed in a computing system, each virtual environment selected from a virtual machine and a virtual appliance, the runtime information including information of a plurality of read-only layers in the plurality of virtual environments and containers, wherein each read-only layer of the plurality of read-only layers has a respective weight value assigned thereto;

retrieving at least one deployment policy specifying to select at least one read-only layer having the highest or lowest accumulative weight value among the plurality of read-only layers for installation of a first container in the computing system;

determining, by operation of one or more computer processors and based on the runtime information and the at least one deployment policy, a first virtual environment of the plurality of virtual environments, to host the first container and that includes one or more read-only layers selected based on the at least one deployment policy; and installing the first container in the first virtual environment, including adding a writable layer on top of the one or more read-only layers selected based on the at least one deployment policy.

2. The computer-implemented method of claim 1, wherein the at least one deployment policy, including a first deployment policy, is retrieved by a container deployer configured to determine a second virtual environment to host a second container and that includes one or more read-only layers selected based on a second deployment policy specifying to select at least one read-only layer having the highest or lowest count of read-only layers of the plurality of read-only layers.

3. The computer-implemented method of claim 1, wherein the at least one deployment policy, including a first deployment policy, is retrieved by a container deployer configured to determine a second virtual environment to host a second container and that includes one or more read-only layers selected based on a second deployment policy specifying to select at least one read-only layer having the largest or smallest size of read-only layers of the plurality of read-only layers.

4. The computer-implemented method of claim 1, wherein the at least one deployment policy, including a first deployment policy, is retrieved by a container deployer configured to determine a second virtual environment to host a second container and that includes one or more read-only layers selected based on a second deployment policy specifying to select at least one read-only layer having a specified read-only layer of the plurality of read-only layers.

5. The computer-implemented method of claim 1, further comprising migrating the first container from the first virtual environment to another virtual environment.

6. The computer-implemented method of claim 1, wherein an indication that the first container is installed in the first virtual environment is output, wherein the first container comprises a first new container.

7. The computer-implemented method of claim 6, wherein the computing system comprises a cloud computing system, wherein the first virtual environment is determined by a cloud container deployer, wherein the first contained is installed in the first environment by a cloud manager operatively connected to the cloud container deployer.

8. The computer-implemented method of claim 7, wherein the highest or lowest accumulative weight value comprises the highest accumulative weight value, wherein the cloud container deployer is configured to determine a second virtual environment to host a second container and that includes one or more read-only layers selected based on a second deployment policy specifying to select at least one read-only layer having the highest or lowest count of read-only layers of the plurality of read-only layers, the second container comprising a second new container.

9. The computer-implemented method of claim 8, wherein the cloud container deployer is further configured to determine a third virtual environment to host a third container and that includes one or more read-only layers selected based on a third deployment policy specifying to select at least one read-only layer having the largest or smallest size of read-only layers of the plurality of read-only layers, the third container comprising a third new container.

10. The computer-implemented method of claim 9, wherein the cloud container deployer is further configured to determine a fourth virtual environment to host a fourth container and that includes one or more read-only layers selected based on a fourth deployment policy specifying to select at least one read-only layer having a specified read-only layer of the plurality of read-only layers, the fourth container comprising a fourth new container.

11. The computer-implemented method of claim 10, wherein the first container is installed in the first virtual environment responsive to a request, wherein the runtime information of the plurality of virtual environments and containers is retrieved via a system scan procedure and by a system scanning problem operatively connected to the cloud container deployer, wherein the system scan procedure is executed based on, in respective instances, a scheduled periodicity and a predefined triggering event, wherein the computer-implemented method further comprises migrating, by the cloud manager, the first container from the first virtual environment to another virtual environment.

12. A system of virtual container deployment, the system comprising:
   one or more computer processors;
   a memory containing a program that, when executed by the one or more computer processors, performs an operation comprising:
      retrieving runtime information of a plurality of virtual environments and containers installed in the system, each virtual environment selected from a virtual machine and a virtual appliance, the runtime information including information of a plurality of read-only layers in the plurality of virtual environments and containers, wherein each read-only layer of the plurality of read-only layers has a respective weight value assigned thereto;
      retrieving at least one deployment policy specifying to select at least one read-only layer having the highest or lowest accumulative weight value among the plurality of read-only layers for installation of a first container in the system;
      determining, based on the runtime information and the at least one deployment policy, a first virtual environment of the plurality of virtual environments, to host the first container and that includes one or more read-only layers selected based on the at least one deployment policy; and
      installing the first container in the first virtual environment, including adding a writable layer on top of the one or more read-only layers selected based on the at least one deployment policy.

13. The system of claim 12, wherein the at least one deployment policy, including a first deployment policy, is retrieved by a container deployer configured to determine a second virtual environment to host a second container and that includes one or more read-only layers selected based on a second deployment policy specifying to select at least one read-only layer having the highest or lowest count of read-only layers of the plurality of read-only layers.

14. The system of claim 12, wherein the at least one deployment policy, including a first deployment policy, is retrieved by a container deployer configured to determine a second virtual environment to host a second container and that includes one or more read-only layers selected based on a second deployment policy specifying to select at least one read-only layer having the largest or smallest size of read-only layers of the plurality of read-only layers.

15. The system of claim 12, wherein the at least one deployment policy, including a first deployment policy, is retrieved by a container deployer configured to determine a second virtual environment to host a second container and that includes one or more read-only layers selected based on a second deployment policy specifying to select at least one read-only layer having a specified read-only layer of the plurality of read-only layers.

16. The system of claim 12, wherein the operation further comprises migrating the first container from the first virtual environment to another virtual environment.

17. A computer program product for virtual container deployment, the computer program product comprising:
   a computer-readable storage medium having computer readable program code embodied therewith, the computer readable program code executable by one or more computer processors to perform an operation comprising:
      retrieving runtime information of a plurality of virtual environments and containers installed in a computing system, each virtual environment selected from a virtual machine and a virtual appliance, the runtime information including information of a plurality of read-only layers in the plurality of virtual environments and containers, wherein each read-only layer of the plurality of read-only layers has a respective weight value assigned thereto;
      retrieving at least one deployment policy specifying to select at least one read-only layer having the highest or lowest accumulative weight value among the plurality of read-only layers for installation of a first container in the computing system;
      determining, based on the runtime information and the at least one deployment policy, a first virtual environment of the plurality of virtual environments, to host the first container and that includes one or more read-only layers selected based on the at least one deployment policy; and
      installing the first container in the first virtual environment, including adding a writable layer on top of the one or more read-only layers selected based on the at least one deployment policy.

18. The computer program product of claim 17, wherein the at least one deployment policy, including a first deployment policy, is retrieved by a container deployer configured to determine a second virtual environment to host a second container and that includes one or more read-only layers selected based on a second deployment policy specifying to select at least one read-only layer having the highest or lowest count of read-only layers of the plurality of read-only layers.

19. The computer program product of claim 17, wherein the at least one deployment policy, including a first deployment policy, is retrieved by a container deployer configured to determine a second virtual environment to host a second container and that includes one or more read-only layers selected based on a second deployment policy specifying to select at least one read-only layer having the largest or smallest size of read-only layers of the plurality of read-only layers.

20. The computer program product of claim 17, wherein the at least one deployment policy, including a first deployment policy, is retrieved by a container deployer configured to determine a second virtual environment to host a second container and that includes one or more read-only layers selected based on a second deployment policy specifying to select at least one read-only layer having a specified read-only layer of the plurality of read-only layers.

21. The computer program product of claim 17, wherein the operation further comprises migrating the first container from the first virtual environment to another virtual environment.

* * * * *